Aug. 13, 1929.   L. BYRNE ET AL   1,724,070
SOLDERING IRON
Filed Dec. 5, 1928
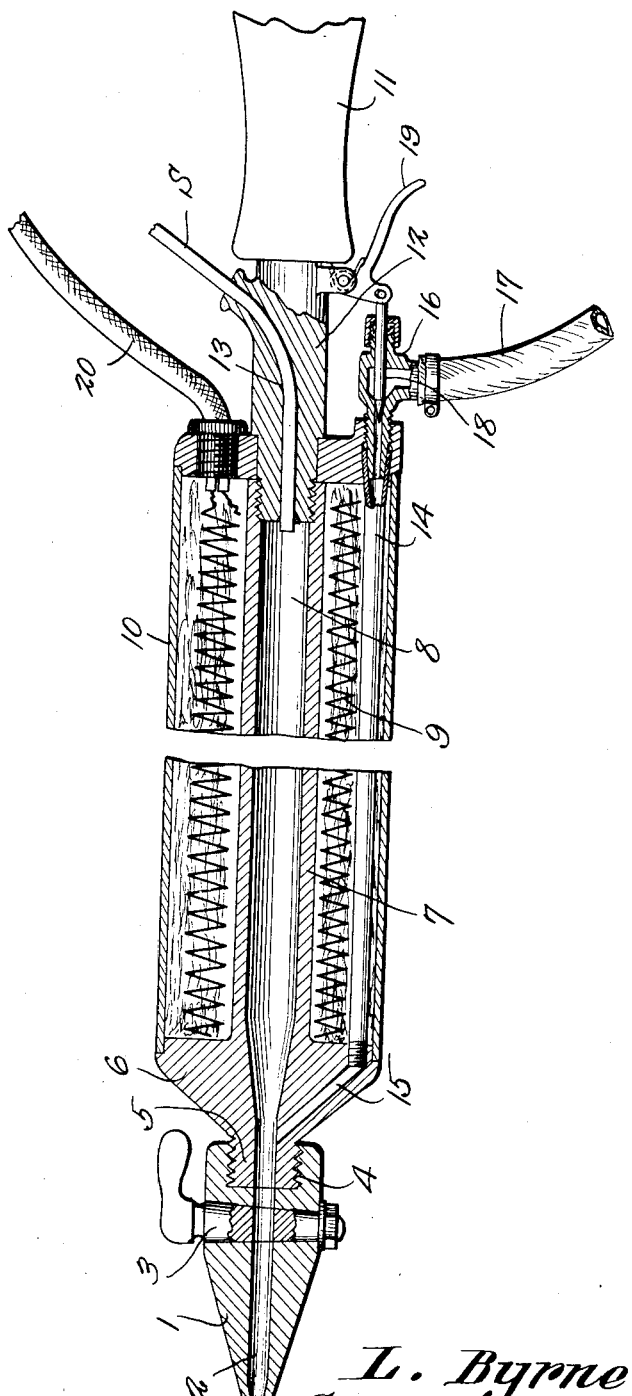

Patented Aug. 13, 1929.

1,724,070

UNITED STATES PATENT OFFICE.

LAWRENCE BYRNE AND GLENN P. LOWELL, OF CHICAGO, ILLINOIS.

SOLDERING IRON.

Application filed December 5, 1928. Serial No. 324,011.

This invention relates to a soldering iron, one of the objects being to provide a device of this character utilizing a magazine compartment adapted to be heated whereby solder will be maintained in a fluid state ready to be supplied to the point of the iron as needed.

A further object is to provide a means whereby the molten solder adjacent the point of the tool can be ejected under pressure controlled by the user.

A further object is to provide simple and efficient means for feeding solder in strip form to the magazine where it can be melted.

With the foregoing and other objects in view which will appear as the description proceeds, the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawing the preferred form of the invention has been shown.

In said drawing, which is a longitudinal section through the soldering iron, parts being broken away, the numeral 1 designates the point or head of the soldering iron preferably tapered as shown, and having a small bore 2 extending longitudinally therethrough, the flow of molten solder through this bore being controlled by a valve 3. One end of the bore is counterbored and threaded as shown at 4 to receive a threaded nipple 5 located at one end of a housing 6.

The housing 6 is formed with a central core 7 through which is extended an enlarged passage 8 constituting the reservoir for molten solder. The core is surrounded by an electric heating unit 9 which, in turn, can be completely housed in the shell 10 of the structure. A handle 11 is provided with a shank 12 which is screwed into one end of the core 7 and has a passage 13 extending from one side of the shank to that end thereof seated in the core. This passage is adapted to receive one end portion of a strip S of solder which can be fed longitudinally into the compartment 8 where it will be reduced to a molten state when a current of electricity is directed into the unit 9.

An air conducting pipe or tube 14 is mounted in the structure and extends longitudinally thereof, one end of this tube opening into a passage 15 which discharges into the outlet end of the reservoir or compartment 8. A valve casing 16 is carried by the other end of the structure close to the handle 11 and discharges into the tube 14, this casing being provided with an air supply tube 17 leading from a pump or other source of air under pressure. A valve 18 is mounted in the casing 16 and serves normally to close communication between said casing and the tube 14. By means of a spring controlled lever 19 mounted on handle 11, the valve 18 can be unseated so as to permit air under pressure to flow into the tube 14 and thence to the outlet end of the soldering iron.

A cord 20 is extended into one end of the structure and serves to conduct current to the heating unit 9. The solder S can be mounted on a reel, not shown, and fed therefrom as needed into the compartment 8.

Normally the valve 3 is closed and air to the tube 14 is shut off. A supply of solder is fed longitudinally into the compartment 8 and current is directed into the unit 9 so that this solder will be quickly reduced to a molten state. When it is desired to use the soldering iron the valve 3 is opened and after the point of the device has been placed where the solder is to be deposited, lever 19 can be actuated to unseat valve 18. This will cause air under pressure to blow against a portion of the solder between the valve 3 and the compartment 8 so that said portion will be forced longitudinally through the bore 2 and be delivered on to the work.

What is claimed is:

1. A soldering iron including a point, an electrically heated solder reservoir communicating therewith, a valve for controlling the flow of solder from the reservoir to the point, and means for directing air under pressure into the outlet end of the reservoir adjacent to the valve for ejecting molten solder from the point.

2. A soldering iron including a heating unit, a solder reservoir extending therethrough, a point having an opening therethrough communicating with the reservoir, a valve for controlling the flow of solder through the opening, means for feeding solder into the reservoir, means for directing air under pressure to the solder in the point, and means under control of the operator for controlling the flow of air to the point.

3. A soldering iron including a solder reservoir, a heating unit for melting the contents of the reservoir, a valved outlet point communicating with the reservoir, and means for directing air under pressure against the solder to eject it through the outlet.

4. A soldering iron including a point, a reservoir communicating therewith, means for heating the reservoir, a valve for controlling the flow of solder from the reservoir to the point, and means for directing air under pressure into the reservoir for ejecting molten solder from the point.

In testimony that we claim the foregoing as our own, we have hereto affixed our signatures.

LAWRENCE BYRNE.
GLENN P. LOWELL.